United States Patent
Tsujikawa

[11] Patent Number: 6,022,110
[45] Date of Patent: Feb. 8, 2000

[54] PROJECTION COLOR LIQUID CRYSTAL DISPLAY APPARATUS

[75] Inventor: Susumu Tsujikawa, Tokyo, Japan

[73] Assignee: NEC Corporation, Tokyo, Japan

[21] Appl. No.: 09/115,669

[22] Filed: Jul. 14, 1998

[30] Foreign Application Priority Data

Jul. 15, 1997 [JP] Japan ................................ 9-189839

[51] Int. Cl.[7] ............................................. G03B 21/14
[52] U.S. Cl. ............................ 353/20; 353/31; 349/8; 359/634
[58] Field of Search ............................ 353/20, 31, 34, 353/37; 349/7.5, 8, 9; 359/634

[56] References Cited

U.S. PATENT DOCUMENTS

| | | | |
|---|---|---|---|
| 5,237,435 | 8/1993 | Kurematsu et al. | 353/31 |
| 5,726,719 | 3/1998 | Tanak et al. | 349/8 |
| 5,772,299 | 6/1998 | Koo et al. | 353/20 |
| 5,826,959 | 10/1998 | Atsuchi | 353/20 |
| 5,852,479 | 12/1998 | Ueda et al. | 349/9 |
| 5,865,521 | 2/1999 | Hashizume et al. | 353/38 |

FOREIGN PATENT DOCUMENTS

| | | |
|---|---|---|
| 62-295024 | 12/1987 | Japan . |
| 64-11289 | 1/1989 | Japan . |
| 3-208013 | 9/1991 | Japan . |
| 4-97146 | 3/1992 | Japan . |
| 4-233580 | 8/1992 | Japan . |
| 5-66504 | 3/1993 | Japan . |
| 6-75541 | 3/1994 | Japan . |
| 6-202066 | 7/1994 | Japan . |
| 6-308492 | 11/1994 | Japan . |
| 6-324347 | 11/1994 | Japan . |
| 7-146474 | 6/1995 | Japan . |
| 7-306410 | 11/1995 | Japan . |

*Primary Examiner*—William Dowling
*Attorney, Agent, or Firm*—Sughrue, Mion, Zinn, Macpeak & Seas, PLLC

[57] ABSTRACT

A projection color liquid crystal display apparatus includes a light source, and a light separator to which light emitted from the light source is inputted. The light separator separates the light inputted thereto into color lights of the three primary colors of red, green and blue, converts each of the color lights into one of p-polarized light and s-polarized light and outputs the polarized lights. In a light path of the light outputted from the light separator, a liquid crystal display element having a plurality of pixels arranged corresponding to the individual color lights obtained by the color separation of the light separator and a projection lens for projecting the light outputted from the liquid crystal display element to a screen are disposed.

16 Claims, 8 Drawing Sheets

PROJECTION COLOR LIQUID CRYSTAL DISPLAY APPARATUS

BACKGROUND OF THE INVENTION

1. Field of the Invention

This invention relates to a projection color liquid crystal display apparatus of the single panel type which projects a display image of a single color liquid crystal display element in an enlarged scale on a screen, and more particularly to a projection color liquid crystal display apparatus which is used principally to display an image in a personal computer, a television set or a video cassette recorder.

2. Description of the Related Art

Projection color liquid crystal display apparatus which project an image displayed by a liquid crystal display element in an enlarged scale are divided into the three panel type in which three liquid crystal display elements are employed and the single panel type in which a single liquid crystal display element is employed. In a projection color liquid crystal display apparatus of the three panel type, each of color lights of the three primary colors of red, green and blue obtained by color separation of light of a light source is irradiated upon one of the three liquid crystal display elements which corresponds to the color. Consequently, images are displayed by the individual liquid crystal display elements, and the images are optically composed into an image. The image composed in this manner is projected by a projection lens. However, the color liquid crystal display apparatus of the three panel type has a comparatively large size and requires a high cost because the optical system thereof is complicated. In contrast, a projection color liquid crystal display apparatus of the single panel type is superior in terms of size and production cost of apparatus to the projection color liquid crystal display apparatus of the three panel type because it involves only one liquid crystal display element.

In an ordinary color liquid crystal display apparatus of the single panel type, filters of the three primary colors of red, green and blue are formed in a a mosaic fashion in a liquid crystal display element in a similar manner as in a liquid crystal television set of the direct viewing type. When light from a light source illuminates the liquid crystal display element, color lights selected by the color filters of the individual colors pass through pixels of the liquid crystal display element. For example, for a pixel which displays red, the color filter of red is formed, and the color light of red passes through the red color filter, but the color lights of green and blue are absorbed or reflected by the red color filter. Accordingly, only one third of the light emitted from the total source inputted to the liquid crystal display element is utilized as a display image, and the projection color liquid crystal display apparatus of the single panel type has a problem in that the brightness of an image finally projected is approximately one third that of a projection color liquid crystal display apparatus of the three panel type when it employs the same light source.

One of solutions to the problem just described is disclosed in Japanese Patent Laid-Open No. 60538/1992 wherein a single liquid crystal display element provided with a micro-lens array is illuminated by light color-separated by three dichroic mirrors of special arrangement as described below.

The projection color liquid crystal display apparatus disclosed in the document mentioned above includes, as shown in FIG. 1, light source 101 including parabolic mirror 102, three dichroic mirrors 121B, 121R and 121G serving as light separators disposed in an advancing direction of light from light source 101 and inclined by different angles from each other as hereinafter described, polarization plate 108, micro-lens array 106, liquid crystal display element 107, polarization plate 109, field lens 122 and projection lens 110 successively disposed in an advancing direction of light reflected by dichroic mirrors 121B, 121R and 121G, and screen 111 to which a color display image is projected by projection lens 110. Reference symbols R, G and B in FIG. 1 represent red, green and blue, respectively. Also in the following description, R, G and B are used in the same meanings.

Dichroic mirror 121B has a characteristic that it reflects light of a wavelength region of blue and transmits therethrough light of red and green which are in longer wavelength regions. Dichroic mirror 121R has different characteristic that it reflects light of a wavelength region of red and transmits therethrough light of blue and green which are in shorter wavelength regions. Dichroic mirror 121G has still a different characteristic that it reflects light of wavelength regions of green and blue and transmits light of red which is in the longer wavelength region. The three dichroic mirrors 121B, 121R and 121G are disposed at angles successively different by several degrees from a mutually parallel condition. The angle defined by each two adjacent dichroic mirrors is designed so that color lights reflected by the dichroic mirrors may be converged to pixels corresponding to the individual color lights in liquid crystal display element 107 by micro-lens array 106.

In the conventional projection color liquid crystal display apparatus having the construction described above, white light emitted from light source 101 is converted into substantially parallel light by parabolic mirror 102 and then inputted to dichroic mirror 121B, by which the light of blue is reflected. The lights of red and green which pass through dichroic mirror 121B without being reflected are inputted to dichroic mirror 121R, by which the color light of red is reflected. Similarly, the light of green which passes through dichroic mirror 121R without being reflected is inputted to dichroic mirror 121G, by which it is reflected. The lights of the three primary colors reflected in this manner are inputted to polarization plate 108. Then, only polarized light components of a particular direction called linearly polarized light which is used for a display image pass through polarization plate 108 and then are inputted at individually different angles to micro-lens array 106. Since the color lights are reflected by three dichroic mirrors 121B, 121R and 121G inclined in such a manner as described above, the color lights are converged to pixels corresponding to the individual color lights in liquid crystal display element 107 by the individual lenses of micro-lens array 106. The color lights of R, G and B are selectively inputted to pixels of the individually corresponding colors in liquid crystal display element 107 in this manner, and emerge as a display image from liquid crystal display element 107. The emergent lights are inputted to polarization plate 109, through which only linearly polarized components pass so that they are inputted to field lens 122. The lights having passed through liquid crystal display element 107 and tending to expand are converged by field lens 122, and the thus converged lights are projected in an expanded scale to screen 111 by projection lens 110. Although field lens 122 is not particularly required, the aperture of projection lens 110 can be reduced by employing field lens 122.

As described above, with a projection color liquid crystal display apparatus which employs a micro-lens array, since color lights are selectively inputted to pixels in a liquid crystal display element which correspond to the individual color lights, no color filter is required. As a result, since the projection color liquid crystal display apparatus is free from loss of light by a color filter, it can utilize light more efficiently than another apparatus in which a color filter is employed.

With the conventional projection color liquid crystal display apparatus described above, however, while white light is separated into lights of red, green and blue using three dichroic mirrors 121B, 121R and 121G having wavelength selectivity, since light from the light source is natural light, in order to utilize the light as a display image on the liquid crystal display element, polarization plate 108 must be used to convert natural light from the light source into linearly polarized light. Accordingly, one of the polarized light components of p-polarized light and s-polarized light which are included in the natural light is absorbed and lost by polarization plate 108. In other words, the loss of approximately one half the total light emitted from the light source cannot be avoided. Further, the light absorbed by polarization plate 108 changes into heat, which gives rise to a problem that it deteriorates the performance of polarization plate 108. Consequently, there is a limitation in employment of a high-power light source.

As described above, the conventional projection color liquid crystal display apparatus is disadvantageous in that it is low in utilization efficiency of light from a light source due to absorption of light by a polarization plate and that the polarization plate is deteriorated as a result of absorption of light.

Further, fine adjustment in arrangement is required individually for the three dichroic mirrors, and besides, there is the possibility that the dichroic mirrors may be displaced out of position by vibrations.

SUMMARY OF THE INVENTION

It is an object of the present invention to provide a projection color liquid crystal display apparatus wherein light emitted from a light source can be utilized to the utmost to obtain a bright projected image.

It is another object of the present invention to provide a projection color liquid crystal display apparatus wherein color separation is effected without using a dichroic mirror and fine adjustment of an optical system is not required.

In order to attain the objects described above, according to the present invention, a projection color liquid crystal display apparatus comprises a light source, a light separator for color separating light emitted from the light source into color lights of the three primary colors of red, green and blue, and a liquid crystal display element to which the lights outputted from the light separator are inputted. The light separator separates the light from the light source into color lights of the three primary colors, converts the color lights into polarized lights each of which is one of p-polarized light and s-polarized light and outputs the polarized lights. Accordingly, since substantially all of the polarized light components of p-polarized light and s-polarized light included in the light from the light source are utilized as light for illuminating the liquid crystal display element, a projected image as bright as that of a projection color liquid crystal display apparatus of the three panel type is obtained. Further, even where a polarization plate is disposed on the light inputting side of the liquid crystal display element, since absorption of light does not occur with the polarization plate, otherwise possible deterioration of the polarization plate is prevented.

According to a preferred embodiment of the present invention, the light separator includes first and second polarizing separating elements each including three light reflecting films which reflect only the s-polarized light of particular wavelength regions individually corresponding to the color lights but pass the lights of the remaining wavelength regions, and a polarizing converter for converting the p-polarized light inputted thereto into s-polarized light and reflecting the s-polarized light in the opposite direction to the inputting direction, and the first polarizing separating element, the second polarizing separating element and the polarizing converter are disposed in order along the advancing direction of the light from the light source.

Where the light separator is constructed in such a manner as described above, in the first polarizing separating element, only the s-polarized light of the color lights obtained by the color separation is selectively outputted to the liquid crystal display element by the three light reflecting films while the p-polarized light is inputted to the second polarizing separating element. The p-polarized light inputted to the second polarizing separating element passes once through the second polarizing separating element and is inputted to the polarizing converter, and the p-polarized light is converted into s-polarized light by the polarizing converter and then inputted to the second polarizing separating element again. Here, the s-polarized light inputted to the second polarizing separating element is color separated by the three light reflecting films and then outputted to the liquid crystal display element.

In this instance, particularly where the three light reflecting films of each of the first and second polarizing separating elements are formed in the inside of a colorless and transparent square pole member, adjustment of the positions of the light reflecting films becomes unnecessary and besides no displacement in their positions by vibrations occurs.

Further, according to another preferred embodiment of the present invention, the first polarizing separating element includes, as the three light reflecting films, a first light reflecting film which reflects s-polarized light of the wavelength region of blue and passes light of the remaining wavelength regions therethrough, a second light reflecting film which reflects s-polarized light of the wavelength region of red and passes light of the remaining wavelength regions therethrough, and a third light reflecting film which reflects s-polarized light of the wavelength regions of blue and green and transmits light of the remaining wavelength regions therethrough, and the first light reflecting film, the second light reflecting film and the third light reflecting film are disposed in this order from the light source side.

Meanwhile, the second polarizing separating element includes, as the three light reflecting films, a fourth light reflecting film which reflects s-polarized light of the wavelength region of blue and passes light of the remaining wavelength regions therethrough, a fifth light reflecting film which reflects s-polarized light of the wavelength region of red and passes light of the remaining wavelength regions therethrough, and a sixth light reflecting film which reflects only s-polarized light of the wavelength region of green and passes light of the remaining wavelength regions therethrough, and the fourth light reflecting film, the fifth light reflecting film and the sixth light reflecting film are disposed in this order from the light source side. Alternatively, the projection color liquid crystal display apparatus may be constructed such that the second polarizing separating element includes, as the three light reflecting films, a fourth light reflecting film which reflects s-polarized light of the wavelength regions of blue and green and passes light of the remaining wavelength regions therethrough, a fifth light reflecting film which reflects s-polarized light of the wavelength region of red and passes light of the remaining wavelength regions therethrough, and a sixth light reflecting film which reflects only s-polarized light of the wavelength region of blue and passes light of the remaining wavelength regions therethrough, and the fourth light reflecting film, the fifth light reflecting film and the sixth light reflecting film are disposed in this order from the light source side.

Further, where the polarizing converter includes a optical retardation plate for passing inputted light therethrough while providing a phase difference by a ¼ wavelength, and a light reflecting member for reflecting the light, which has passed through the optical retardation plate, toward the optical retardation plate again, the p-polarized light having passed through the second polarizing separating element is reflected, after it passes through the optical retardation plate, by the light reflecting member and then passes through the optical retardation plate again, whereafter it is inputted to the second polarizing separating element. Accordingly, the light inputted to the second polarizing separating element again is changed into s-polarized light. Consequently, all of the light from the light source is converted into s-polarized light before it is inputted to the liquid crystal display element. For the light reflecting member, a mirror or a right angle prism may be used.

According to a still further preferred embodiment of the present invention, a micro-lens array is interposed between the light separator and the liquid crystal display element for converging the color lights obtained by the color separation of the light separator individually to corresponding ones of the pixels of the liquid crystal display element. Further, a pair of polarization plates are disposed on the light inputting side and outputting side of the liquid crystal display element.

The above and other objects, features and advantages of the present invention will become apparent from the following description with reference to the accompanying drawings which illustrate examples of the present invention.

DESCRIPTION OF THE PREFERRED EMBODIMENTS

First Embodiment

A first embodiment of the present invention is described with reference to FIGS. 2 to 5. It is to be noted that, in FIG. 2, p-polarized light and s-polarized light are represented by p and s, respectively.

Figure 2:
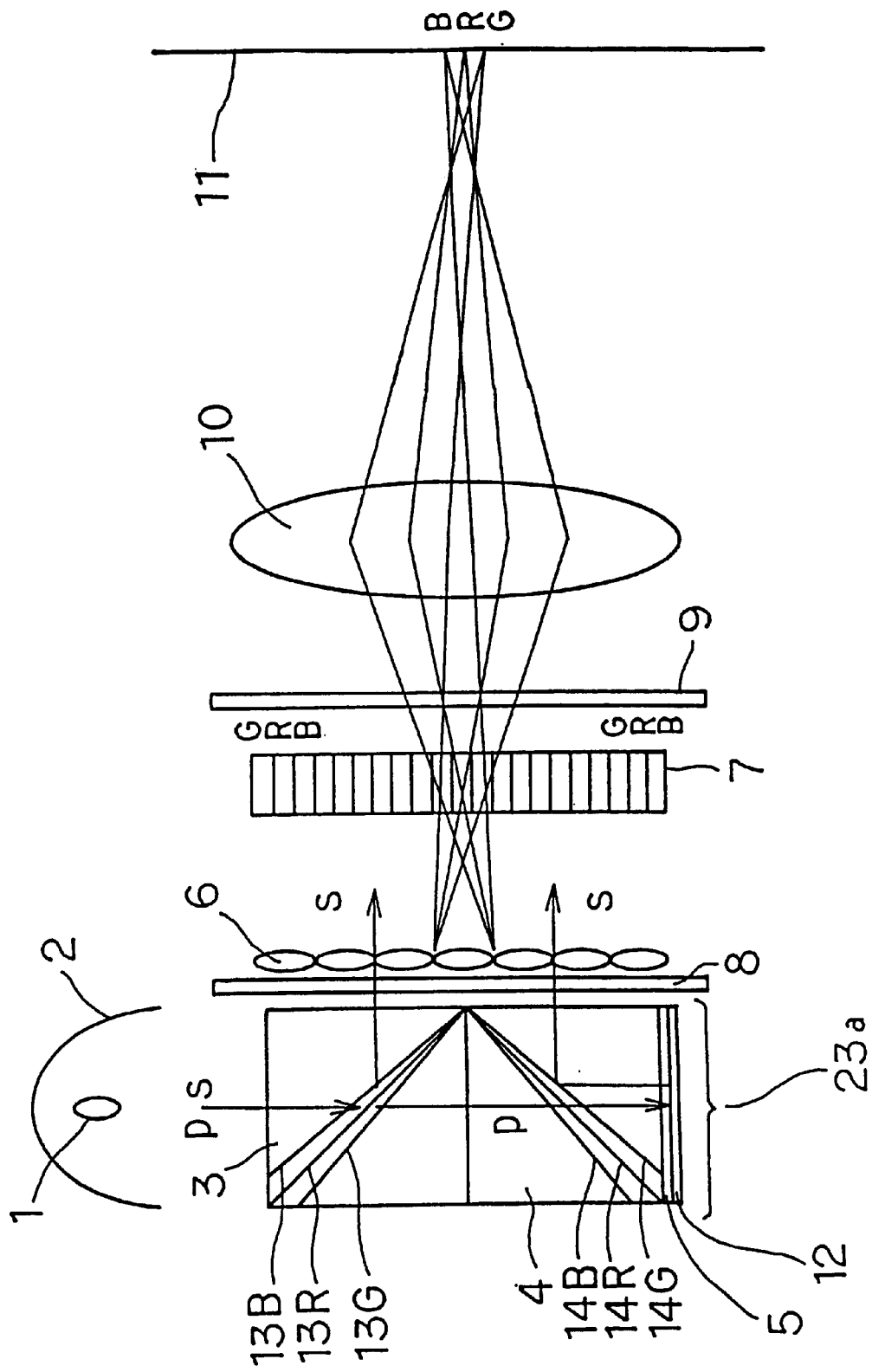
FIG. 2 is a schematic diagrammatic view showing a first embodiment of a projection color liquid crystal display apparatus of the present invention.

The projection color liquid crystal display apparatus of the present embodiment includes, as shown in FIG. 2, parabolic mirror 2 provided in light source 1 for converting light emitted from light source 1 into parallel light, and light separator 23a provided in an advancing direction of the parallel light from light source 1. Light separator 23a includes first polarizing separating element 3, second polarizing separating element 4, optical retardation plate 5 and mirror 12 arranged in this order from light source 1 side in the advancing direction of light from light source 1.

Optical retardation plate 5 provides a phase difference of a ¼ wavelength to light when the light passes therethrough once. Optical retardation plate 5 and mirror 12 convert p-polarized light into s-polarized light.

In the inside of first polarizing separating element 3, light reflecting film 13B serving as a first light reflecting film, light reflecting film 13R serving as a second light reflecting film and light reflecting film 13G serving as a third light reflecting film are formed. Light reflecting film 13R defines an angle of 45 degrees with respect to the advancing direction of parallel light from light source 1. Light reflecting film 13B is disposed on light source 1 side with respect to light reflecting film 13R and is inclined a little by a desired angle with respect to light reflecting film 13R. Light reflecting film 13G is disposed on the opposite side to light source 1 with respect to light reflecting film 13R and is inclined a little by a desired angle with respect to light reflecting film 13R.

In the inside of the second polarizing separating color separating element, light reflecting film 14B serving as a fourth light reflecting film, light reflecting film 14R serving as a fifth light reflecting film and light reflecting film 14G serving as a sixth light reflecting film are formed. Light reflecting film 14R defines an angle of 45 degrees with respect to the advancing direction of parallel light from light source 1 and defines an angle of 90 degrees with respect to light reflecting film 13R in first polarizing separating element 3. Light reflecting film 14B is disposed on light source 1 side with respect to light reflecting film 14R and is inclined a little by a desired angle with respect to light reflecting film 14R. Light reflecting film 14G is disposed on the opposite side to light source 1 with respect to light reflecting film 14R and is inclined a little by a desired angle with respect to light reflecting film 14R.

Each of light reflecting films 13B, 13R, 13G, 14B, 14R and 14G selectively reflects s-polarized light in a particular wavelength region and passes p-polarized light therethrough as hereinafter described with reference to FIGS. 3a to 3c and 4a to 4c. Accordingly, the s-polarized light reflected by light reflecting film 13B, 13R and 13G of light inputted from light source 1 to first polarizing separating element 3 emerges from one side face of first polarizing separating element 3 which extends in parallel to the advancing direction of light from light source 1. The face of the second polarizing separating element 4 from which s-polarized light emerges is within the same plane as a face of first polarizing separating element 3 from which s-polarized light emerges, and from the face of the second polarizing separating element 4 from which s-polarized light is emitted, s-polarized light which is inputted to and reflected by light reflecting films 14B, 14R and 14G from the opposite side to light source 1 side is outputted.

Sidewardly of the s-polarized light outputting faces of first polarizing separating element 3 and second polarizing separating element 4, polarization plate 8 serving as a polarizer, micro-lens array 6, liquid crystal display element 7, polarization plate 9 serving as an analyzer, and projection lens 10 are disposed in this order along the advancing direction of the s-polarized light from the s-polarized light outputting faces. Polarization plate 8 passes s-polarized light therethrough. Liquid crystal display element 7 has a plurality of pixels arranged in a matrix corresponding to each of the three color lights separated by light separator 23a. Screen 11 is disposed in the advancing direction of light which has passed through liquid crystal display element 7 and been projected by projection lens 10.

In the following, an example of a spectral reflection characteristic of each of light reflecting films 13B, 13R and 13G provided in first polarizing separating element 3 is described with reference to FIGS. 3a, 3b and 3c.

Figure 3A:
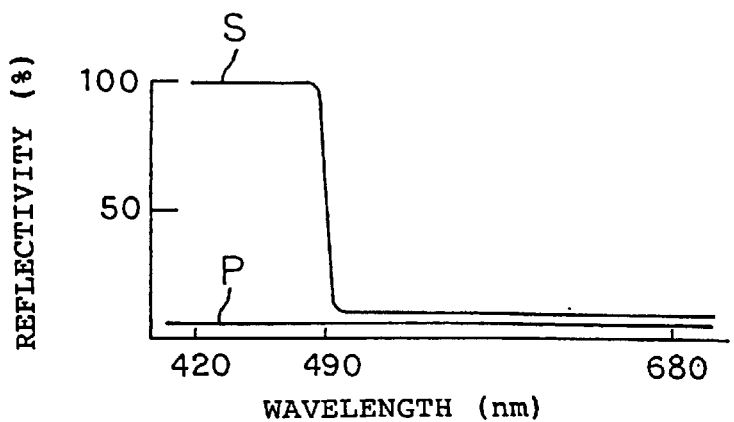
FIGS. 3a, 3b and 3c are diagrams illustrating an example of a spectral reflection characteristic of each of light reflecting films in a first polarizing separating element shown in FIG. 2.
Figure 3B:
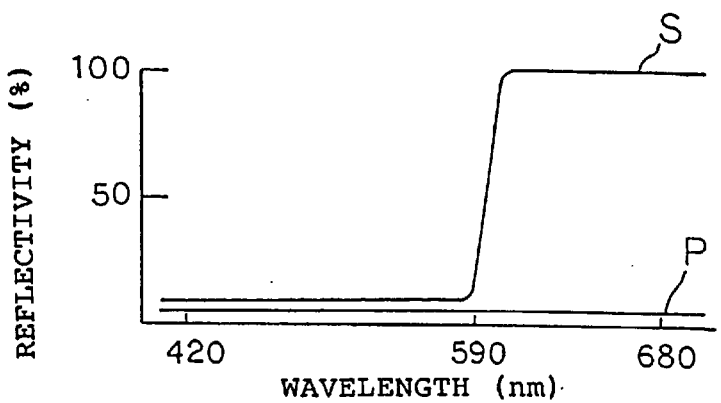
Figure 3C:
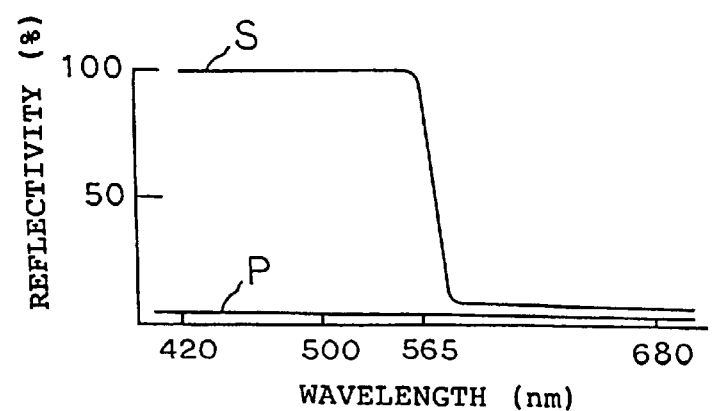

FIG. 3a illustrates a spectral reflection characteristic of light reflecting film 13B, FIG. 3b illustrates a spectral reflection characteristic of light reflecting film 13R, and FIG. 3c illustrates a spectral reflection characteristic of light reflecting film 13G. Further, in FIGS. 3a to 3c, the axis of abscissa indicates the wavelength (nm) and the axis of ordinate indicates the reflectivity (%), and p and s represent p-polarized light and s-polarized light, respectively. In the present embodiment, the wavelength of light of blue is 420 to 490 nm; the wavelength of light of green is 500 to 565 nm; and the wavelength of light of red is 590 to 680 nm. It is to be noted that B, R and G used in the following description represent blue, red and green, respectively.

As seen from FIG. 3a, light reflecting film 13B has a characteristic that it selectively reflects s-polarized light of B whose wavelength is 420 to 490 nm and passes s-polarized light of the wavelength regions of G and R and p-polarized light of the wavelength regions of B. R and G therethrough.

As seen from FIG. 3b, light reflecting film 13R has another characteristic that it selectively reflects s-polarized light of R whose wavelength is 590 to 680 and passes s-polarized light of B and G and p-polarized light of B, G and R. While, according to the characteristic illustrated in FIG. 3b, light reflecting film 13R passes s-polarized light of B therethrough, since actually s-polarized light of B has been previously reflected by light reflecting film 13B, light reflecting film 13R may have a characteristic that it passes s-polarized light of B therethrough or another characteristic that it reflects s-polarized light of B.

As seen from FIG. 3c, light reflecting film 13G has a further characteristic that it reflects s-polarized light of G and B whose wavelength is shorter than 565 nm and passes s-polarized light of R and p-polarized light of B, G and R. While, according to the characteristic illustrated in FIG. 3c, light reflecting film 13G reflects s-polarized light of B and passes s-polarized light of R therethrough, since actually s-polarized light of B has been reflected by previously light reflecting film 13B and s-polarized light R has been reflected previously by light reflecting film 13R, light reflecting film 13G may have a characteristic that it passes s-polarized light of B and R therethrough or another characteristic that it reflects s-polarized light of B and R.

Now, an example of a spectral reflection characteristic of each of light reflecting films 14B, 14R and 14G in second polarizing separating element 4 is described with reference to FIGS. 4a, 4b and 4c.

Figure 4A:
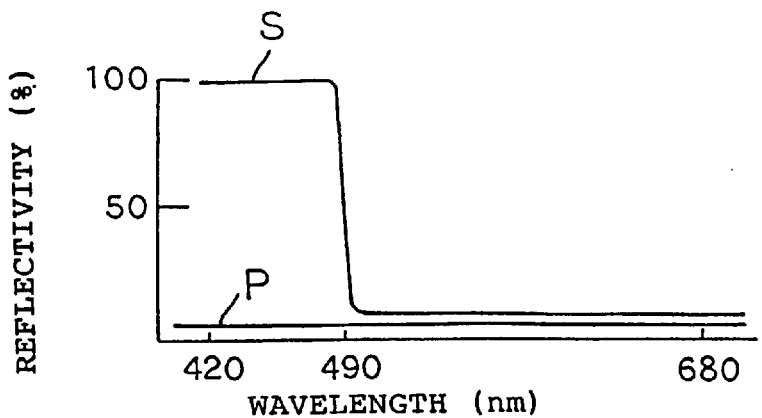
FIGS. 4a, 4b and 4c are diagrams illustrating an example of a spectral reflection characteristic of each of light reflecting films in a second polarizing separating element shown in FIG. 2.

FIG. 4a illustrates a spectral reflection characteristic of light reflecting film 14B; FIG. 4b illustrates a spectral reflection characteristic of light reflecting film 14R; and FIG. 4c illustrates a spectral reflection characteristic of light reflecting film 14G. Further, in FIGS. 4a to 4c, the axis of abscissa indicates the wavelength (nm) and the axis of ordinate indicates the reflectivity (%), and p and s represent p-polarized light and s-polarized light, respectively.

Figure 4B:
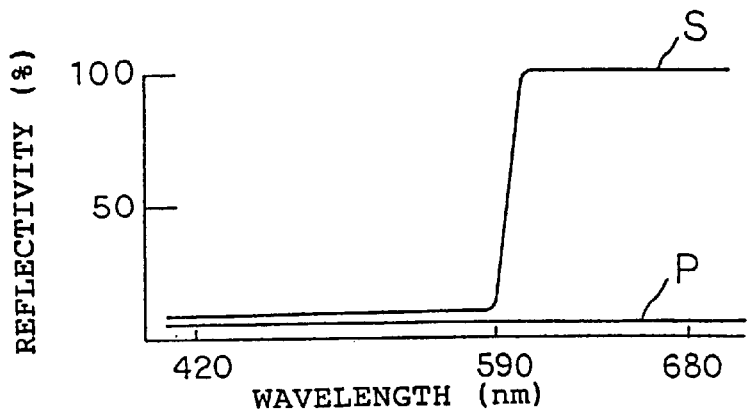
Figure 4C:
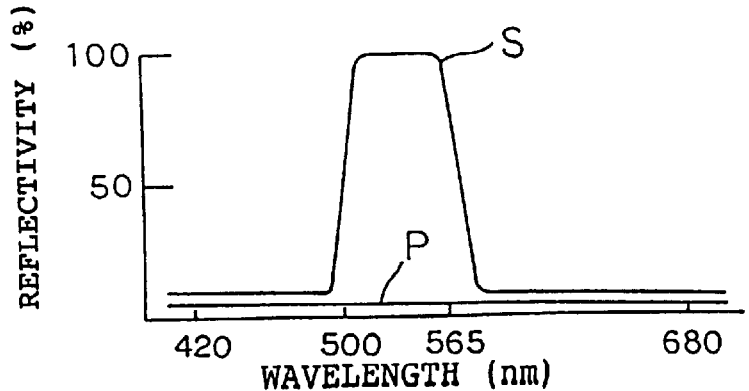

As seen from FIG. 4c, light reflecting film 14G has a characteristic that it selectively reflects only s-polarized light of G whose wavelength is 500 to 565 nm and passes s-polarized light of B and R and p-polarized light of B, G and R therethrough.

As seen from FIG. 4b, light reflecting film 14R has another characteristic that it reflects s-polarized light of R whose wavelength is 590 to 680 nm and passes s-polarized light of B and G and p-polarized light of B, G and R. While, in the characteristic illustrated in FIG. 4b, light reflecting film 14R passes s-polarized light of G therethrough, since actually s-polarized light of G has been reflected previously by light reflecting film 14G, light reflecting film 14R may have a characteristic that it passes s-polarized light of G therethrough or another characteristic that it reflects s-polarized light of G.

As seen from FIG. 4a, light reflecting film 14B has a further characteristic that it reflects s-polarized light of B whose wavelength is 420 to 490 and passes s-polarized light of G and R and p-polarized light of B, G and R. While, in the characteristic illustrated in FIG. 4a, light reflecting film 14B passes s-polarized light of G and R therethrough, since actually s-polarized light of G has been reflected previously by light reflecting film 14G and s-polarized light of R has been reflected previously by light reflecting film 14R, light reflecting film 14B may have a characteristic that it passes s-polarized light of G and R therethrough or another characteristic that it reflects s-polarized light of G and R.

Now, an optical action of the projection color liquid crystal display apparatus having the construction described above is described with reference to FIGS. 2 to 5. As seen from FIG. 2, white light emitted from light source 1 is converged by parabolic mirror 2 and inputted as substantially parallel light to first polarizing separating element 3. In first polarizing separating element 3, s-polarized light of the light from light source 1 which is in the wavelength region of B is reflected by light reflecting film 13B, and s-polarized light of the light from light source 1 which is in the wavelength region of R passes through light reflecting film 13B and is reflected by light reflecting film 13R. Further, s-polarized light of the light from light source 1 which is in the wavelength region of G passes through light reflecting films 13B and 13R and is reflected by light reflecting film 13G. The s-polarized light of the parallel light from light source 1 is color separated in the order of B, R and G by light reflecting films 13B, 13R and 13G in first polarizing separating element 3 in this manner and is reflected toward micro-lens array 6.

Meanwhile, all of the p-polarized light components of the colors of R, G and B pass through light reflecting films 13B, 13R and 13G. The p-polarized light which is outputted from first polarizing separating element 3 is inputted to second polarizing separating element 4, in which it passes through light reflecting films 14B, 14R and 14G. Then, the p-polarized light having passed through second polarizing separating element 4 passes through optical retardation plate 5 and is reflected in the direction opposite to the advancing direction thereof by mirror 12, so that it passes through optical retardation plate 5 again. Here, since the p-polarized light passes back and forth through optical retardation plate 5, it is converted into s-polarized light, and this s-polarized light is inputted to second polarizing separating element 4 again.

Thereafter, in second polarizing separating element 4, the s-polarized light which is in the wavelength region of G is reflected by light reflecting film 14G, but the s-polarized light which is in the wavelength region of R passes through light reflecting film 14G and is reflected by light reflecting film 14R. Further, the s-polarized light which is in the wavelength region of B successively passes through light reflecting films 14G and 14R in this order and is reflected by light reflecting film 14B. The s polarized from optical retardation plate 5 is separated in the order of G, R and B by light reflecting films 14G, 14R and 14B in second polarizing separating element 4 in this manner and reflected toward micro-lens array 6.

Figure 5:
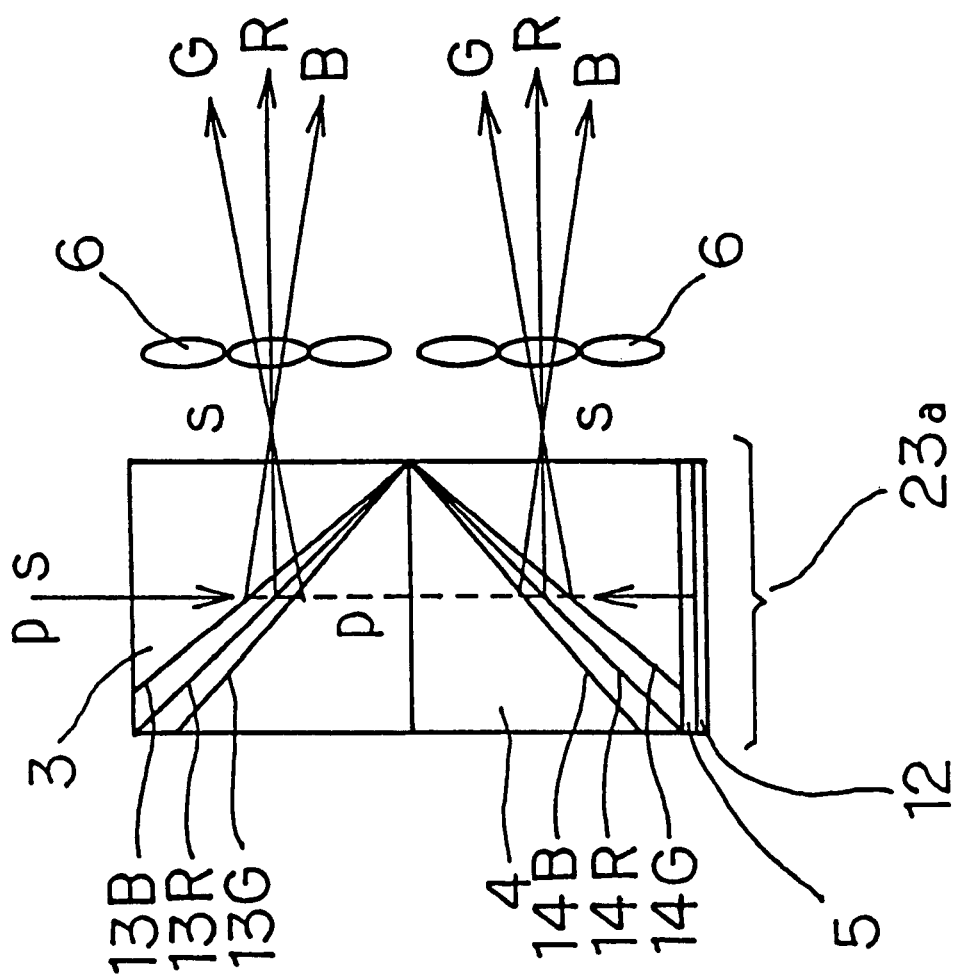
FIG. 5 is a diagrammatic view illustrating an optical action of a light separator shown in FIG. 2.

FIG. 5 is a diagrammatic view illustrating an optical action of light separator 23a shown in FIG. 2. In first polarizing separating element 3, light reflecting films 13B, 13R and 13G are disposed not in parallel to each other such that each of them is inclined by several degrees with respect to an adjacent one of them. Also in second polarizing separating element 4, light reflecting films 14B, 14R and 14G are disposed not in parallel to each other such that each of them is inclined by several degrees with respect to an adjacent one of them. Consequently, as seen in FIG. 5, lights of R, G and B reflected by the light reflecting films are inputted at angles a little different from each other to micro-lens array 6. Since light reflecting films 13R and 14R which reflect light of R are disposed in an inclined relationship by 45 degrees with respect to the advancing direction of light emitted from light source 1, the light of R is inputted perpendicularly to micro-lens array 6. Lights of B and G are inputted at certain angles with respect to light of R to micro-lens array 6.

Referring back to FIG. 2, s-polarized lights outputted from first polarizing separating element 3 and second polarizing separating element 4 pass through polarization plate 8 and are inputted to micro-lens array 6. Thereupon, since lights of R, G and B are inputted at different incident angles from each other to the lenses of micro-lens array 6 as described above, the color lights having passed through micro-lens array 6 are converged so that they may be focused at different locations from each other. Since the focuses of the color lights coincide with positions of the pixels formed on liquid crystal display element 7, the light of R is inputted to the pixels corresponding to R; the light of G is inputted to the pixels corresponding to G; and the light of B is inputted to the pixels corresponding to B. This principle is common to that of the conventional projection color liquid crystal display apparatus. The light having passed through liquid crystal display element 7 then passes through polarization plate 9 and is then converged by projection lens 10, whereafter it is projected to screen 11. As a result, an image displayed on liquid crystal display element 7 is projected in an enlarged scale to screen 11.

As described above, in the projection color liquid crystal display apparatus of the present embodiment, two polarizing separating elements 3 and 4 having the two functions of separation of s-polarized light and p-polarized light and separation of R, G and B and optical retardation plate 5 and mirror 12 are used in combination, both components of p-polarized light and s-polarized light of natural light from light source 1 are utilized as illuminating light of liquid crystal display element 7. Consequently, a light utilization efficiency close to 100% can be achieved in principle, and improvement in light utilization efficiency by two times that of the prior art can be achieved. Further, since light inputted to polarization plate 8 is linearly polarized light, it is little absorbed by polarization plate 8, and consequently, deterioration of any polarization plate which is a problem of the prior art cannot occur at all. Since the polarization directions are made uniform, even if polarization plate 8 is not employed, the apparatus functions as such apparatus. However, it is preferable to compensate for a performance of separation of p-polarized light and s-polarized light using a polarizing separating element and employ a polarization plate in order to prevent a decline in contrast by external light or stray light.

Further, since light reflecting films 13B, 13R and 13G are formed in the inside of first polarizing separating element 3 and light reflecting films 14B, 14R and 14G are formed in the inside of second polarizing separating element 4, a projection color liquid crystal display apparatus which eliminates the necessity for adjustment in arrangement of three dichroic mirrors which are employed in conventional projection color liquid crystal display apparatus and is tough against variations is obtained.

Here, an example of a detailed construction of each component employed in the present embodiment is described. For light source 1, a metal halide lamp of 125 W was used. Alternatively, a high intensity white light source such as a xenon lamp or a halogen lamp may be used. For parabolic mirror 2, a shaped glass mirror was used. In order to remove infrared ray components from the light source, a cold mirror composed of a dielectric multilayer film is formed by vapor deposition on the surface of parabolic mirror 2 adjacent light source 1. It is to be noted that not a parabolic mirror but a spherical mirror, an ellipsoidal mirror or some other aspherical mirror may be employed. Further, there is a construction in which reflected white light is once converged to a spot by a condenser lens and unnecessary light removed by means of a slit or a pinhole. In such an instance, however, an optical system for converting the converged light back into parallel light must be interposed in the path of light between the light source and the polarizing separating element.

Each of first polarizing separating element 3 and second polarizing separating element 4 includes three light reflecting films in the inside of a colorless and transparent square pole member, and the length or height of each side of the square pole member is determined principally based on the size of liquid crystal display element 7. Here, while SF10 is used as a material for the square pole member, any other material than SF10 may be employed if light reflecting films which satisfy the spectral reflection characteristics illustrated in FIGS. 3a to 3c and 4a to 4c can be formed. Further, light reflecting films 13B, 13R and 13G in first polarizing separating element 3 and light reflecting films 14B, 14R and 14G in second polarizing separating element 4 are each formed from a dielectric multilayer film.

Optical retardation plate 5 is formed from a uniaxial oriented film having a desired double refraction property and is made so that it provides a phase difference of ¼ wavelength when light passes once therethrough. Accordingly, when light passes back and forth through optical retardation plate 5, the polarization direction thereof is rotated by 90 degrees, and consequently, s-polarized light is converted into p-polarized light while p-polarized light is converted into s-polarized light. In the present embodiment, optical retardation plate 5 is used to convert p-polarized light into s-polarized light. For mirror 12, an ordinary mirror having a metal layer formed by vapor deposition thereon was used. However, a dielectric mirror may be used alternatively.

Micro-lens array 6 has very small lenses formed on a face thereof at the ratio of one to three pixels of R, G and B of liquid crystal display element 7. Here, a refractive index distribution was formed by selective ion exchange so as to provide micro-lens array 6 with an action of a convex lens. As a method of forming a micro-lens array, a method of molding a plastic or glass substrate using a metal mold or the like is known in addition to the method by selective ion exchange. In the projection color liquid crystal display apparatus of the present invention, any method can be applied.

Liquid crystal display element 7 is composed of liquid crystal filled between two glass substrates on which transparent electrode films which define pixels are provided, and twisted nematic (TN) liquid crystal is used for the liquid crystal. A phase change of the liquid crystal by an applied voltage to each pixel varies the polarization condition of incident light, and the variation of the polarization condition is converted into a variation of the intensity of light by utilizing a polarization plate. As a driving system for the liquid crystal, an active matrix system wherein a thin film transistor serving as a switching element is formed for each pixel to drive the liquid crystal is adopted. For the liquid crystal, super-twisted nematic liquid crystal, ferroelectric liquid crystal, electrically controlled birefringence liquid crystal or some other liquid crystal than TN liquid crystal may be used instead. Further, the driving system for the liquid is not limited to the active matrix system, but may be a simple matrix system of the time division driven type or a like system.

Figure 1:
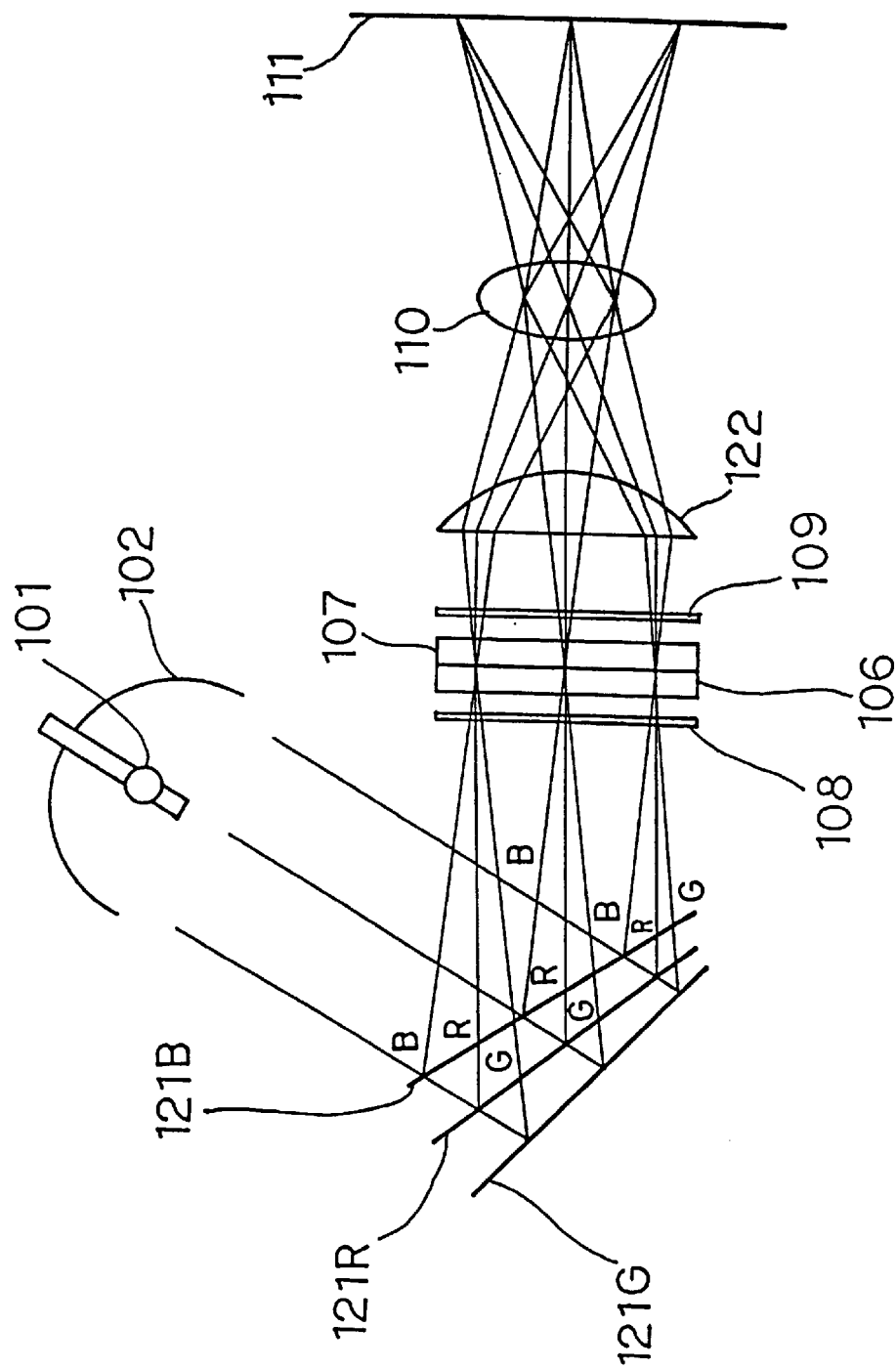
FIG. 1 is a schematic diagrammatic view showing a conventional projection color liquid crystal display apparatus.

Projection lens 10 projects an image displayed on liquid crystal display element 7 in an enlarged scale to the screen. Projection lens 10 includes a focusing mechanism for performing focusing adjustment of a projected image. Projection lens 10 may additionally include a zoom mechanism in order to vary the size of the screen without changing the projection distance. Further, a field lens may be interposed between polarization plate 9 and projection lens 10 to raise the condensing effect as in the conventional apparatus shown in FIG. 1.

Second Embodiment

Figure 6:
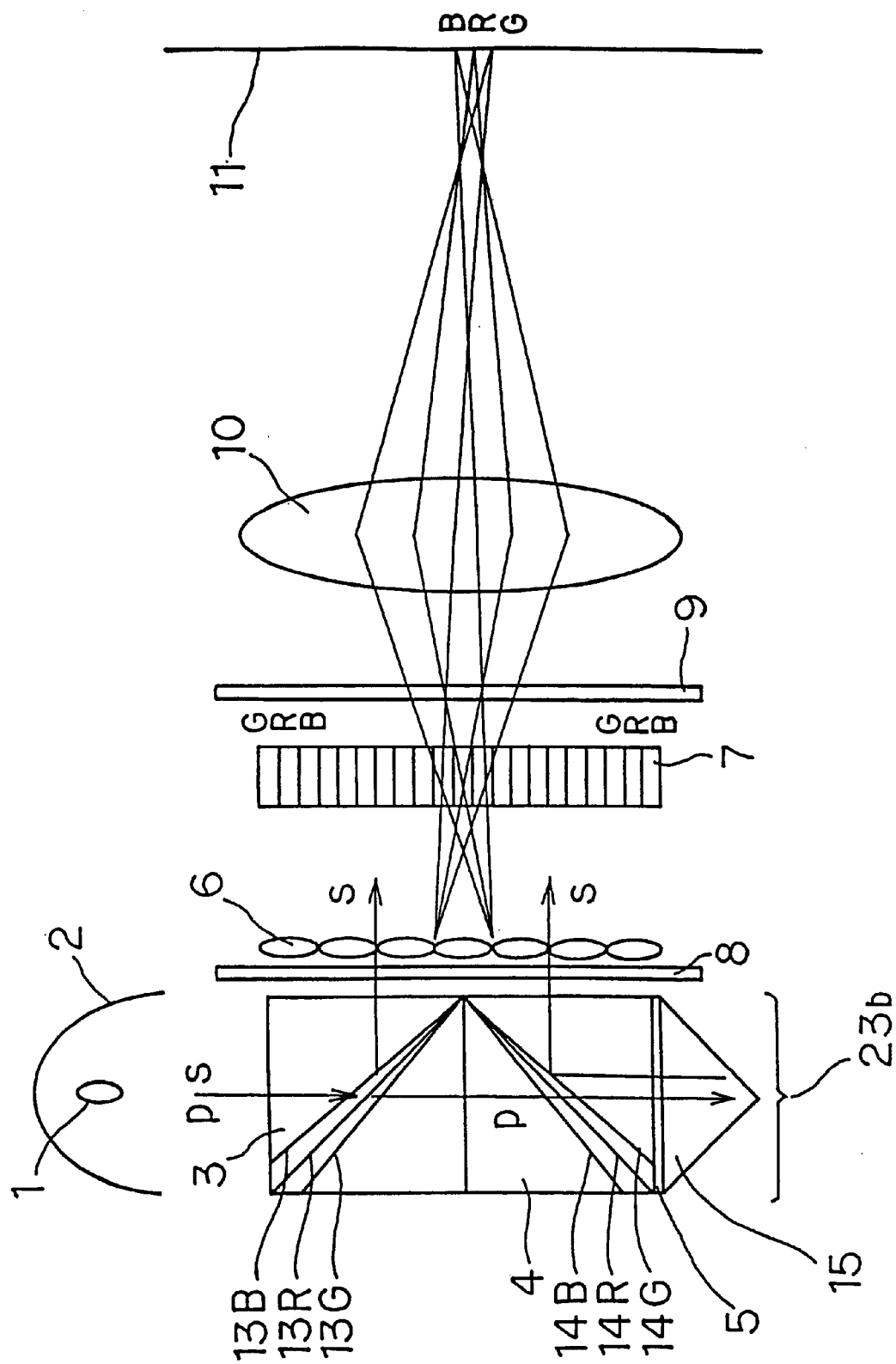
FIG. 6 is a schematic diagrammatic view showing a second embodiment of a projection color liquid crystal display apparatus of the present invention.

A second embodiment of the present invention is described with reference to FIG. 6. The present embodiment is different from the first embodiment in that it employs a right angle prism in place of a mirror as a construction of a light reflecting part of a light separator. In FIG. 6, like components to those of the first embodiment are denoted by like reference symbols. In the following, only differences from the first embodiment are described principally.

In the projection color liquid crystal display apparatus of the present embodiment, as shown in FIG. 6, light separator 23b includes first polarizing separating element 3, second polarizing separating element 4, optical retardation plate 5 and right angle prism 15 disposed in this order from light source 1 side along an advancing direction of light from light source 1. Right angle prism 15 is disposed such that the oblique face thereof contacts with a face of optical retardation plate 5 remote from second polarizing separating element 4.

In the projection color liquid crystal display apparatus having the construction described above, the advancing direction of that part of parallel light from light source 1 which passes through optical retardation plate 5 is folded back to the opposite direction by right angle prism 15 so that the light is inputted to optical retardation plate 5 again. In this instance, since the advancing direction of the light is changed making use of the total internal reflection of light by the side faces of right angle prism 15, right angle prism 15 has no absorption loss of light. Accordingly, the employment of right angle prism 15 is superior to the employment of a mirror as light reflecting means in that no absorption loss of light occurs. Description of an action of the remaining part of the optical system is omitted here because it is similar to that in the first embodiment.

Accordingly, in the projection color liquid crystal display apparatus of the present embodiment, both components of p-polarized light and s-polarized light of natural light from light source 1 are utilized as illuminating light of liquid crystal display element 7 in a similar manner as in the first embodiment. Further, since the projection color liquid crystal display apparatus of the present embodiment employs right angle prism 15 as light reflecting means, it is superior to an alternative apparatus which employs a mirror as light reflecting means in that right angle prism 15 has no absorption loss of light.

Third Embodiment

Figure 7:
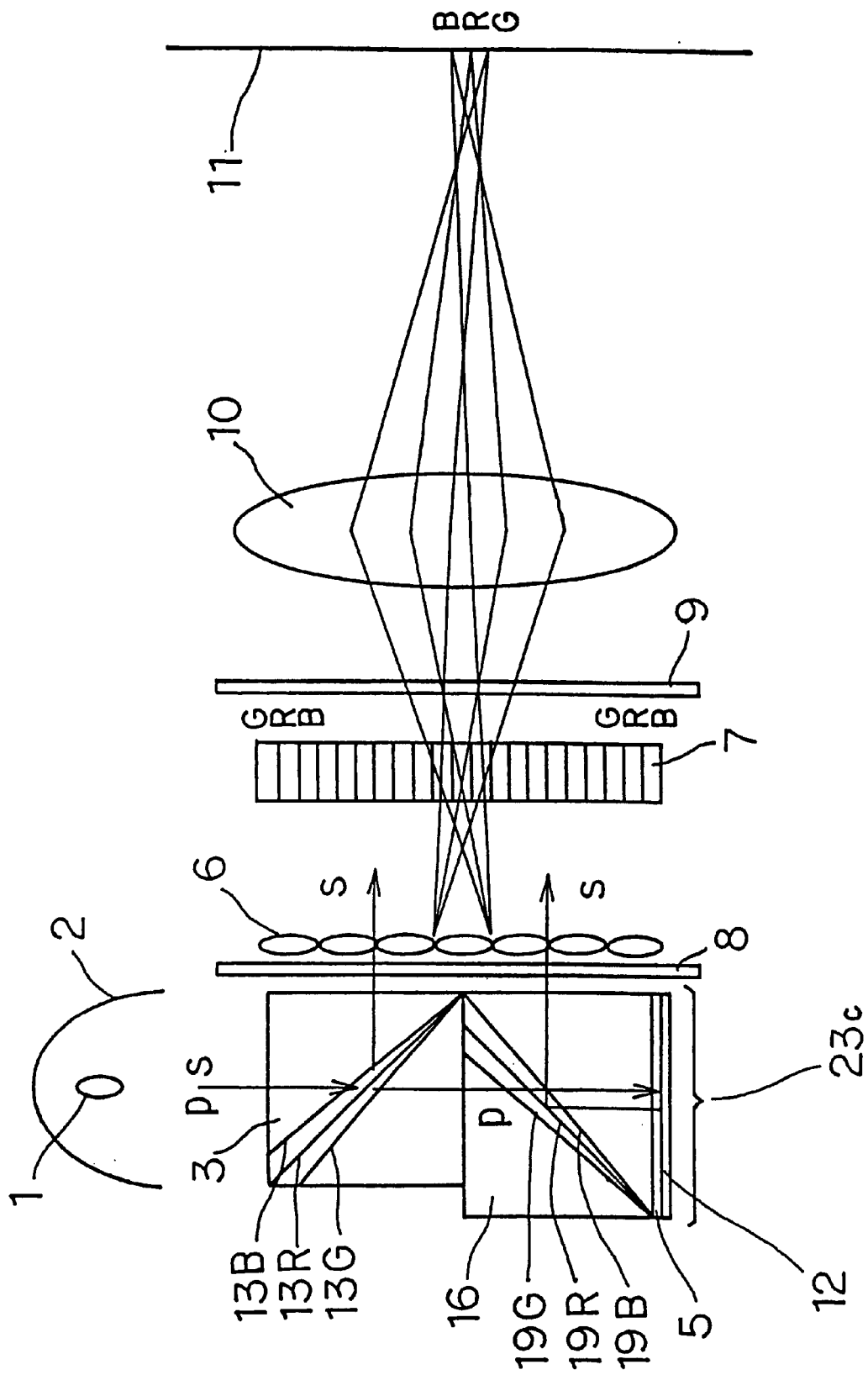
FIG. 7 is a schematic diagrammatic view showing a third embodiment of a projection color liquid crystal display apparatus of the present invention.

A third embodiment of the present invention is described with reference to FIG. 7. The present embodiment is different from the first embodiment in a second polarizing separating element of a light separator. In FIG. 7, like elements to those of the first embodiment are denoted by like reference symbols. In the following description, description is given principally of differences from the first embodiment.

Referring to FIG. 7, in the inside of second polarizing separating element 16 interposed in a light path between first polarizing separating element 3 and optical retardation plate 5, light reflecting film 19G serving as a fourth light reflecting film, light reflecting film 19R serving as a fifth light reflecting film and light reflecting film 19B serving as a sixth light reflecting film are formed.

Light reflecting film 19R defines an angle of 45 degrees with respect to the advancing direction of parallel light from light source 1 and defines another angle of 90 degrees with respect to light reflecting film 13R in first polarizing separating element 3. Light reflecting film 19G is disposed adjacent to light source 1 with respect to light reflecting film 19R and is inclined a little by a desired angle with respect to light reflecting film 19R. Light reflecting film 19B is disposed remotely from light source 1 with respect to light reflecting film 19R and is inclined a little by a desired angle with respect to light reflecting film 19R.

Light reflecting film 19B has the spectral reflection characteristic illustrated in FIG. 3a similarly to light reflecting film 13B employed in the first and second embodiments. While s-polarized light of B is reflected by light reflecting film 19B, s-polarized light of G and R and p-polarized light pass through light reflecting film 19B.

Light reflecting film 19R has the spectral reflection characteristic illustrated in FIG. 3b similarly to light reflecting film 13R employed in the first and second embodiments. While s-polarized light of R is reflected by light reflecting film 19R, s-polarized light of G and B and p-polarized light pass through light reflecting film 19R.

Light reflecting film 19G has the spectral reflection characteristic illustrated in FIG. 3c similarly to light reflecting film 13G employed in the first and second embodiments. While s-polarized light of B and G is reflected by light reflecting film 19G, s-polarized light of R and p-polarized light pass through light reflecting film 19.

Second polarizing separating element 16 having the construction described above is different from second polarizing converting color separating element 4 employed in the first embodiment in the order in which color lights of the three primary colors of light inputted to it from optical retardation plate 5 side are reflected. In particular, while, in second polarizing converting color separating element 4 of the first embodiment shown in FIGS. 2 and 5, light reflected from mirror 12 is reflected and separated in the order of G, R and B, in second polarizing separating element 16, light reflected from mirror 12 is reflected and separated in the order of B, R and G.

Since the wavelength region of G is a wavelength region between the wavelength regions of B and R, it is difficult to design a light reflecting film which reflects only s-polarized light in the wavelength region of G. Accordingly, it is easier to design an optical thin film for a light reflecting film for G of the characteristic illustrated in FIG. 3c than for a light reflecting film for G of the characteristic illustrated in FIG. 4c. Consequently, the third embodiment wherein color separation is performed in the order of B, R and G by second polarizing separating element 16 is more advantageous in formation conditions of a light reflecting film than the first embodiment wherein color separation is performed in the order of G, R and B by the second polarizing converting color separating element. Description of an optical action of the other part of the apparatus is omitted here since it is similar to that of the first embodiment.

In the projection color liquid crystal display apparatus of the present embodiment, similarly as in the first embodiment, both components of p-polarized light and s-polarized light of natural light from light source 1 are utilized as illuminating light of liquid crystal display element 7. Besides, light reflecting film 19G which is formed in the inside of second polarizing separating element 16 in the present embodiment and reflects s-polarized light of the wavelength regions of green and blue is easier in designing of an optical thin film than light reflecting film 14G which is formed in the inside of second polarizing separating element 4 in the first embodiment and reflects s-polarized light only of the wavelength region of green.

Fourth Embodiment

Figure 8:
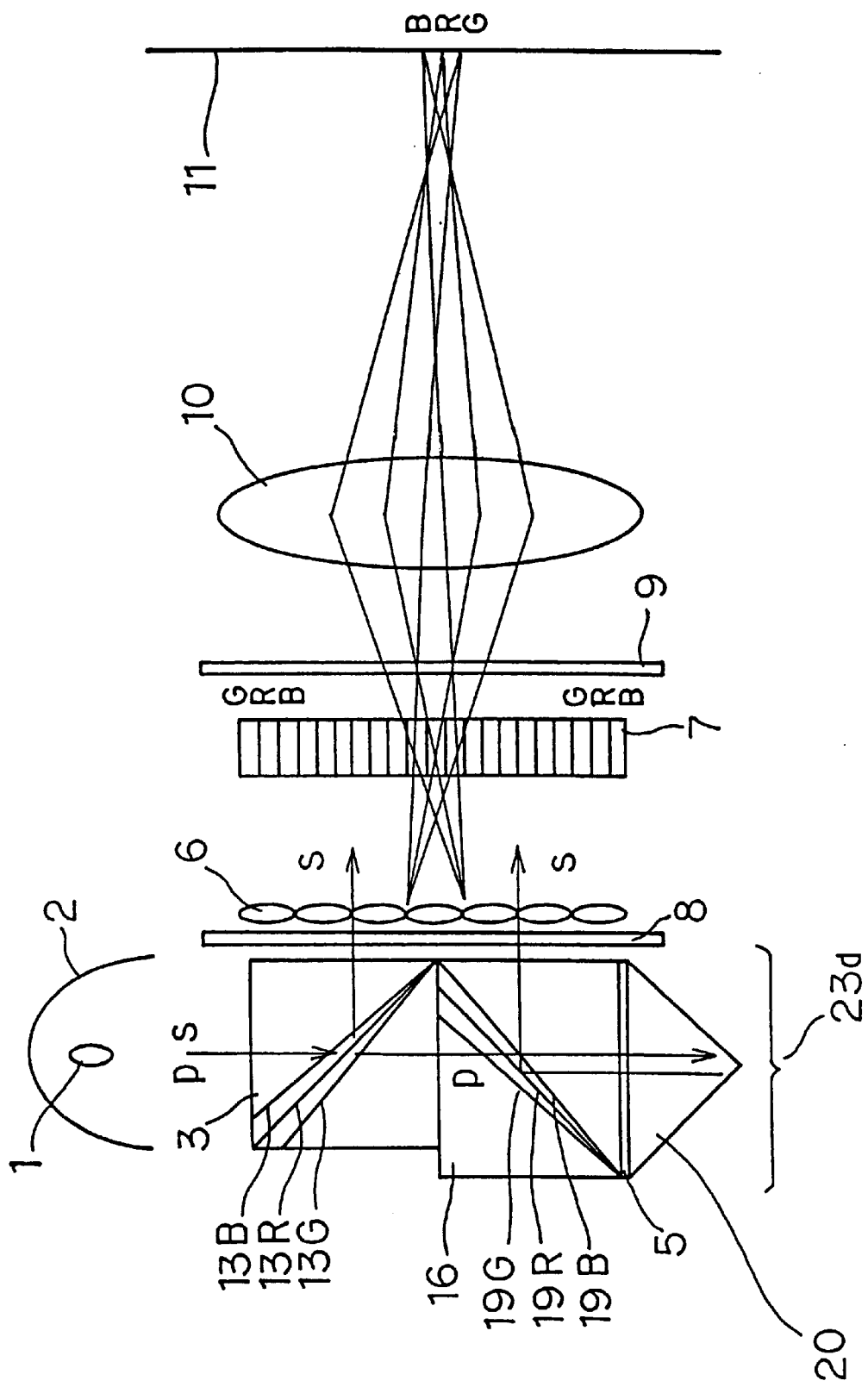
FIG. 8 is a schematic diagrammatic view showing a fourth embodiment of a projection color liquid crystal display apparatus of the present invention.

A fourth embodiment of the present invention is described with reference to FIG. 8. The present embodiment is different from the third embodiment in that it employs a right angle prism in place of a mirror as a construction of a light reflecting part of a light separator. In FIG. 8, like elements to those of the first and third embodiments are denoted by like reference symbols. In the following description, description is given principally of differences from the third embodiment.

In the projection color liquid crystal display apparatus of the present embodiment, as seen in FIG. 8, light separator 23d includes first polarizing separating element 3, second polarizing separating element 16, optical retardation plate 5 and right angle prism 20 disposed in this order from light source 1 side along an advancing direction of light from light source 1. The oblique face of right angle prism 20 contacts with a face of optical retardation plate 5 remote from second polarizing separating element 16.

In the projection color liquid crystal display apparatus having the construction described above, the advancing direction of that part of parallel light from light source 1 which passes through optical retardation plate 5 is folded to the opposite direction by right angle prism 20 so that it is inputted to optical retardation plate 5 again. In this instance, since the advancing direction of light is changed making use of the total internal reflection of light by the side faces of right angle prism 20, right angle prism 20 has no absorption loss of light. Accordingly, the employment of right angle prism 20 is superior to the employment of a mirror as light reflecting means in that it has no absorption loss of light. Description of an optical action of the other part of the optical system is omitted here since it is similar to that of the third embodiment.

Accordingly, in the projection color liquid crystal display apparatus of the present embodiment, both components of p-polarized light and s-polarized light of natural light from light source 1 are utilized as illuminating light of liquid crystal display element 7 similarly as in the first embodiment. Further, it is easier to design an optical thin film for light reflecting film 19G which is formed in the inside of second polarizing separating element 16 of the present embodiment and reflects s-polarized light of the wavelength regions of green and blue than for light reflecting film 14G which is formed in the inside of second polarizing separating element 4 of the first embodiment and reflects s-polarized light only of the wavelength region of green. Besides, the employment of right angle prism 20 as light reflecting means is superior to the employment of a mirror as light reflecting means in that right angle prism 20 has no absorption loss of light.

While preferred embodiments of the present invention have been described using specific terms, such description is for illustrative purposes only, and it is to be understood that changes and variations may be made without departing from the spirit or scope of the following claims.

What is claimed is:

1. A projection color liquid crystal display apparatus, comprising:
   a light source;
   a light separator, said light separator including a plurality of red light separators, a plurality of blue light separators, and a plurality of green light separators, for separating light emitted from said light source into color lights of the three primary colors of red, green and blue and for outputting all of said color lights as polarized lights of one of p-polarized light and s-polarized light;
   a liquid crystal display element to which the lights outputted from said light separator are inputted and which includes a plurality of pixels arranged corresponding to the color lights obtained by the color separation of said light separator; and
   a projection lens for projecting the light outputted from said liquid crystal display element to a screen.

2. A projection color liquid crystal display apparatus as claimed in claim 1, further comprising a micro-lens array interposed between said light separator and said liquid crystal display element for converging the color lights obtained by the color separation of said light separator individually to corresponding ones of pixels of said liquid crystal display element.

3. A projection color liquid crystal display apparatus as claimed in claim 1, further comprising a pair of polarization plates disposed on the light inputting side and light outputting side of said liquid crystal display element, respectively.

4. A projection color liquid crystal display apparatus as claimed in claim 1,
   wherein said light separator includes, disposed in order along the advancing direction of the light from said light source, a first polarizing separating element and a second polarizing separating element,
   wherein said first polarizing separating element and said second polarizing separating element each include at least one red light separator, at least one blue light separator, and at least one green light separator, and wherein said each of said at least one red light separator, said at least one blue light separator, and said at least one green light separator separate only s-polarized lights of particular wavelength regions individually corresponding to said color lights but transmit the lights of the remaining wavelength regions.

5. A projection color liquid crystal display apparatus as claimed in claim 4, wherein said light separator further comprises a polarizing converter to convert p-polarized light into s-polarized light, and wherein said polarizing converter converts p-polarized light inputted thereto into s-polarized light and transmits said s-polarized light from said polarizing converter into said second polarizing separating element.

6. A projection color liquid crystal display apparatus as claimed in claim 1, wherein said plurality of red light separators, said plurality of blue light separators, and said plurality of green light separators are coaxially disposed within said light separator.

7. A projection color liquid crystal display apparatus comprising:

a light source;

a light separator for separating light emitted from said light source into color lights of the three primary colors of red, green and blue, and for outputting said color lights with only one of a polarization and an s-polarization;

a liquid crystal display element to which the lights outputted from said light separator are inputted and which includes a plurality of pixels arranged corresponding to the color lights obtained by the color separation of said light separator; and a projection lens for projecting the light outputted from said liquid crystal display element to a screen wherein said light separator includes a first polarizing separating element, a second polarizing separating element, and a polarizing converter, wherein each of said first polarizing separating element and said second polarizing separating element include three light reflecting films which reflect only the s-polarized light of particular wavelength regions individually corresponding to the color lights but pass the lights of the remaining wavelength regions, and wherein said polarizing converter converts p-polarized light inputted thereto into s-polarized light and transmits this s-polarized light into said second polarizing separating element.

8. A projection color liquid crystal display apparatus as claimed in claim 7, wherein said three light reflecting films of each of said first and second polarizing separating elements are formed in the inside of a colorless and transparent square pole member.

9. A projection color liquid crystal display apparatus as claimed in claim 7, wherein said first polarizing separating element includes, as said three light reflecting films, a first light reflecting film which reflects s-polarized light of the wavelength region of blue and passes light of the remaining wavelength regions therethrough, a second light reflecting film which reflects s-polarized light of the wavelength region of red and passes light of the remaining wavelength regions therethrough, and a third light reflecting film which reflects s-polarized light of the wavelength regions of blue and green and passes light of the remaining wavelength regions therethrough, and said first light reflecting film, said second light reflecting film and said third light reflecting film are disposed in this order from said light source side.

10. A projection color liquid crystal display apparatus as claimed in claim 7, wherein said second polarizing separating element includes, as said three light reflecting films, a fourth light reflecting film which reflects s-polarized light of the wavelength region of blue and passes light of the remaining wavelength regions therethrough, a fifth light reflecting film which reflects s-polarized light of the wavelength region of red and passes light of the remaining wavelength regions therethrough, and a sixth light reflecting film which reflects only s-polarized light of the wavelength region of green and passes light of the remaining wavelength regions therethrough, and said fourth light reflecting film, said fifth light reflecting film and said sixth light reflecting film are disposed in this order from said light source side.

11. A projection color liquid crystal display apparatus as claimed in claim 7, wherein said second polarizing separating element includes, as said three light reflecting films, a fourth light reflecting film which reflects s-polarized light of the wavelength regions of blue and green and passes light of the remaining wavelength regions therethrough, a fifth light reflecting film which reflects s-polarized light of the wavelength region of red and passes light of the remaining wavelength regions therethrough, and a sixth light reflecting film which reflects only s-polarized light of the wavelength region of blue and passes light of the remaining wavelength regions therethrough, and said fourth light reflecting film, said fifth light reflecting film and said sixth light reflecting film are disposed in this order from said light source side.

12. A projection color crystal liquid display apparatus as claimed in claim 7, wherein said polarizing converter includes a optical retardation plate for passing inputted light therethrough while providing a phase difference by a ¼ wavelength, and a light reflecting member for reflecting the light, which has passed through said optical retardation plate, toward said optical retardation plate again.

13. A projection color liquid crystal display apparatus as claimed in claim 12, wherein said light reflecting member is a mirror.

14. A projection color liquid crystal display apparatus as claimed in claim 12, wherein said light reflecting member is a right angle prism.

15. A projection color liquid crystal display apparatus as claimed in claim 7, further comprising a micro-lens array interposed between said light separator and said liquid crystal display element for converging the color lights obtained by the color separation of said light separator individually to corresponding ones of pixels of said liquid crystal display element.

16. A projection color liquid crystal display apparatus as claimed in claim 7, further comprising a pair of polarization plates disposed on the light inputting side and light outputting side of said liquid crystal display element, respectively.

* * * * *